United States Patent [19]

Warner et al.

[11] 4,165,794

[45] Aug. 28, 1979

[54] ELECTRICALLY DRIVEN VEHICLES

[75] Inventors: Peter S. Warner, Henlow; John R. Bicht, Hemel Hempstead, both of England

[73] Assignee: Lucas Industries Limited, Birmingham, England

[21] Appl. No.: 792,276

[22] Filed: Apr. 29, 1977

[30] Foreign Application Priority Data

May 8, 1976 [GB] United Kingdom ............... 19031/76

[51] Int. Cl.² ............................................... B60K 1/00
[52] U.S. Cl. ............................................... 180/65 R
[58] Field of Search ............... 180/64 R, 64 M, 65 R, 180/65 A, 54 E, 65 E

[56] References Cited

U.S. PATENT DOCUMENTS

| 2,208,710 | 7/1940 | Tjaarda | 180/65 E |
| 3,190,387 | 6/1965 | Dow | 180/65 R |

Primary Examiner—Joseph F. Peters, Jr.
Assistant Examiner—Gene A. Church
Attorney, Agent, or Firm—Ladas, Parry, Von Gehr et al

[57] ABSTRACT

Electrical drive apparatus for a vehicle comprising a detachable battery pack and a further unit comprising an electric motor, a differential with output shafts to respective vehicle wheels and a transmission from the motor to the differential including a universally jointed shaft, the axes of the motor differential output shafts and the shaft being substantially parallel and the motor being on the sprung and the differential being on the unsprung part of the vehicle.

8 Claims, 2 Drawing Figures

ELECTRICALLY DRIVEN VEHICLES

This invention relates to electrically driven vehicles of the kind having a battery pack arranged to provide electrical power for an electric motor which drives, through a transmission, wheels or other ground engaging elements on the vehicle.

The invention is principally directed to vehicles which were originally designed for drive by conventional internal combustion engines which are converted to electrical drive, according to the invention.

It is the object of the invention to provide an electrical drive apparatus for a vehicle in a convenient form, particularly for facilitating conversaion from conventional internal combustion engine drive, to electrical drive.

In accordance with the present invention an electrical drive apparatus for a vehicle comprises, in combination, a battery pack unit detachably securable to the vehicle and a further unit comprising an electric motor, a differential with output shafts for connection to ground engaging elements at opposite sides of the vehicle respectively, and a transmission between the motor and the differential, the transmission including an intermediate shaft with universal joints at its ends respectively the motor axis the axis of said intermediate shaft and the axes of the differential output shafts being substantially parallel and the motor being securable to a sprung part of the vehicle, the differential being securable on an unsprung part of the vehicle.

Figure 1:
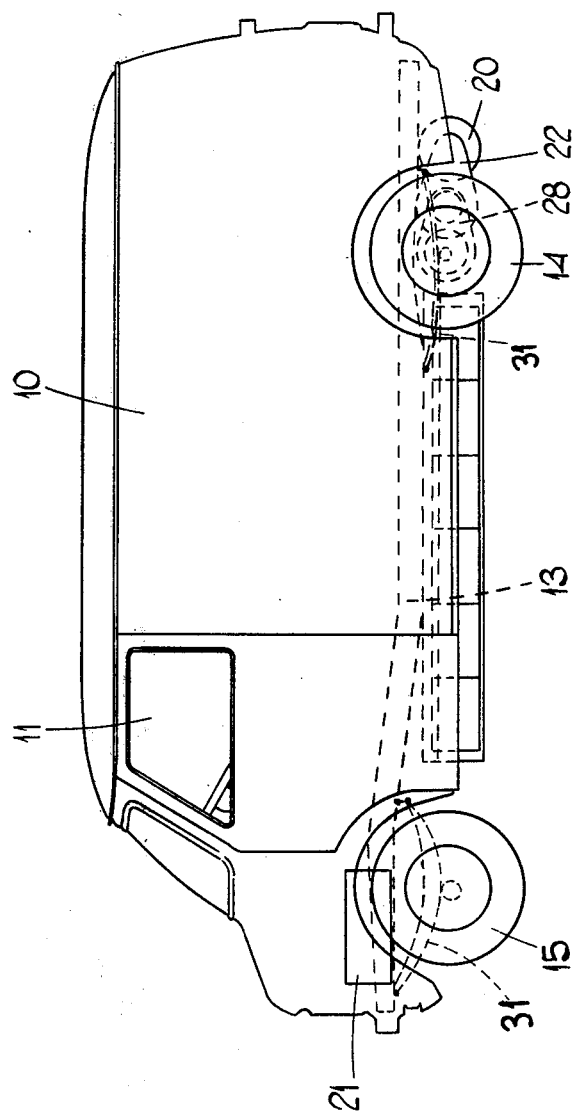
Figure 2:
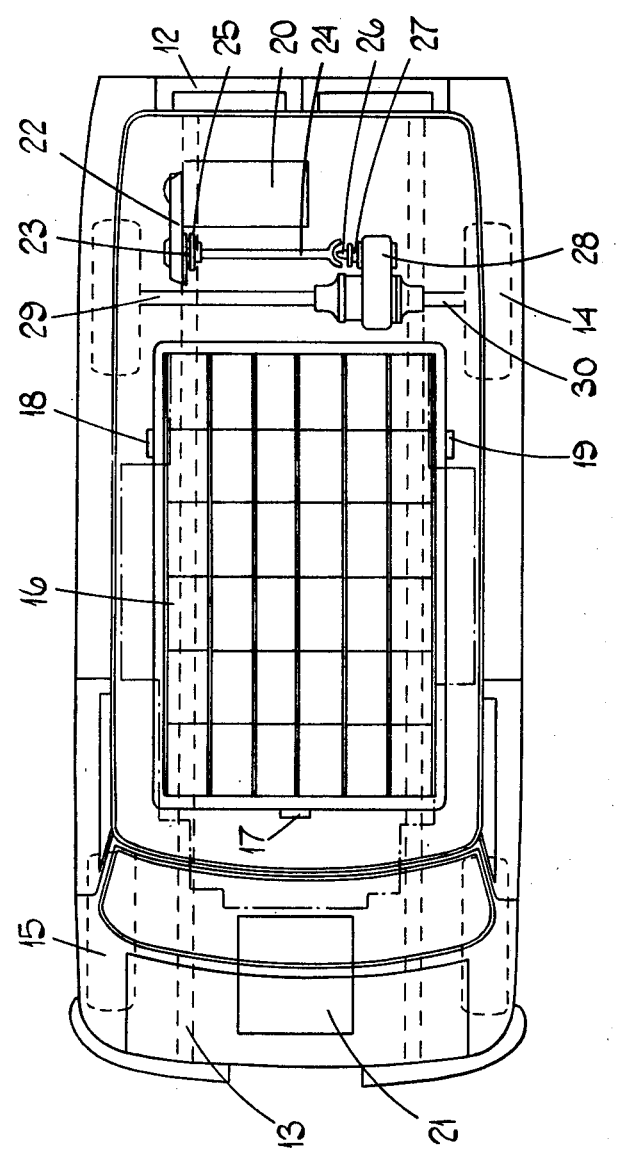

The invention will now be described by way of example with reference to the accompanying drawings in which:

FIG. 1 is a side elevation view showing an electrically driven vehicle constructed in accordance with the invention, and FIG. 2 is a plan view thereof.

The drawings illustrate a light goods van having an enclosed body indicated generally at 10, the front portion of which is a drivers cab 11. Rear loading doors 12, are mounted on the body. The body is mounted on a chassis comprising two parallel or substantially parallel longitudinal members 13, on which also rests the floor of the goods carrying portion of the vehicle.

At the front of the vehicle there is a space which would normally be occupied by an internal combustion engine for driving the rear wheels 14, of the vehicle through conventional gearbox propeller shaft and differential transmission system. Adjacent to the engine space are the front wheels 15 of the vehicle.

The engine and transmission have however, been removed and the vehicle converted into an electrically driven vehicle.

To provide power for such electric drive there is mounted below the chassis in the centre of the vehicle a battery pack 16, comprising a pannier carrying a plurality of individual batteries, which in this example are arranged in six rows of six batteries.

To mount the battery pack as a unit beneath the chassis, there are three fixing points indicated at 17, 18 and 19 respectively. The fixing point 17, is at the front of the battery pack, whereas the fixing points 18 and 19, are at opposite sides respectively near the rear of the battery pack. Each such fixing point includes a blade and socket interengaging combination carried on the battery pack and on the chassis respectively, and there is a fixing pin or other fastening passing through holes in the blade and socket respectively, these holes being aligned only when the battery pack is in its correctly loaded position.

The provision of the three fixing points allows a limited degree of flexing of the chassis which however, is not imparted to the battery pack pannier. Nevertheless the battery pack pannier provides strengthening under the chassis of the vehicle.

The battery pack provides power to run an electric motor 20, situated under the chassis at the rear of the vehicle. Electrical control of the motor is by means of driver controls (not illustrated) which are transmitted to the motor by means of an electrical control unit indicated generally at 21, which occupies the space for the internal combustion engine at the front of the vehicle.

The electric motor is arranged to drive the rear wheels 14, of the vehicle through a transmission system which is formed as a unit with the motor 20.

Secured to one end of the casing at which an outlet shaft is provided is a casing 22, containing a reduction gear system. This may be belt or chain drive or a train of gears.

From the other end of the casing extends an output 23, connected to a propeller shaft 24, through a flexible joint 25, in the form of a resilient disc of known kind.

The other end of the propeller shaft is connected by means of a hook type universal joint to an input shaft 27, to a further casing 28. The further casing 28 contains a differential unit to which the input shaft 27 is connected by belt chain or gear train.

The differential is connected to the rear wheels 14, by respective output shafts 29, 30 which are enclosed in fixed tubes to the hub carriers of the wheels. To the tubes 29, 30 the vehicle chassis members 13 are connected by conventional springing which may be elliptical blade spring mechanisms 31. Coil spring mechanisms may alternatively be used. The differential unit and tubes containing the output shafts 29, 30 are however, fixed so as to move on the springing as a unit.

The motor 20, the propeller shaft 24, and the output shafts 29, 30 from the differential, have their axes lying substantially parallel, these axes furthermore being substantially in one horizontal plane, as indicated in FIG. 1.

The motor 20, is secured to the chassis and is thus sprung weight on the vehicle and the connection between the sprung motor and the unsprung differential and output shafts 29, 30 is the propeller shaft 24. The two output shafts 29, 30 from the differential are of unequal length so that the differential lies in its casing 28, closer to one of the rear wheels 14. Furthermore the electric motor 20, lies closer to the other of the rear wheels, and its casing 22, is secured to that end remote from the differential. By this arrangement the propeller shaft 24 is made as long as possible.

We claim:

1. An electrical drive apparatus for a vehicle having a body, first and second ground engaging elements at opposite respective sides of the vehicle body, and spring means connecting the ground engaging elements to the vehicle body, the drive apparatus comprising, in combination, a battery pack unit detachably securable to the vehicle and a further unit comprising an electric motor having an output shaft, a differential having an input shaft and also having output shafts for connection to the first and second ground engaging elements respectively and a transmission connecting the output shaft of the motor with the input shaft of the differential, the transmission including an intermediate shaft, universal joints at the two opposite ends of the intermediate shaft respectively, one of said universal joints being connected to the motor output shaft and the other to the differential input shaft, and the axis of the motor, the axis of said intermediate shaft and the common axes of the differential output shafts being substantially parallel and the motor being securable to a sprung part of the vehicle, the differential being securable on an unsprung part of the vehicle.

2. An electrical drive apparatus as claimed in claim 1 in which the differential output shafts are of unequal lengths, the differential occupying, in use, a position nearer to one side of the vehicle.

3. An electrical drive apparatus as claimed in claim 2 in which the output shaft of the electric motor is connected to the transmission, in use, at the side of the vehicle remote from the differential.

4. An electrical drive apparatus as claimed in claim 1 in which the electric motor is arranged to be driven from the battery pack through an electrical control unit.

5. An electrically driven vehicle having a body, first and second ground engaging elements at opposite respective sides of the vehicle, and spring means connecting the ground engaging elements to the vehicle body, the vehicle incorporating an electrical drive apparatus which comprises, in combination, a battery pack unit detachably secured to the vehicle and a further unit comprising an electric motor having an output shaft, a differential having an input shaft and also having output shafts connected to the first and second ground engaging elements respectively and a transmission connecting the output shaft of the motor to the input shaft of the differential, the transmission including an intermediate shaft, universal joints at the two opposite ends of the intermediate shaft respectively, one of said universal joints being connected to the motor output shaft and the other to the differential input shaft, and the axis of the motor, the axis of said intermediate shaft and the common axes of the differential output shafts being substantially parallel and the motor being secured to a sprung part of the vehicle and the differential being secured to an unsprung part of the vehicle.

6. A vehicle as claimed in claim 5 in which the differential output shafts are of unequal lengths, the differential occupying a position nearer to one side of the vehicle.

7. A vehicle as claimed in claim 6, in which the output shaft of the electric motor is connected to the transmission at the side of the vehicle remote from the differential.

8. A vehicle as claimed in claim 5, in which the electric motor is arranged to be driven from the battery pack to an electrical control unit.

* * * * *